(12) United States Patent
Yamaguchi (10) Patent No.: US 6,341,074 B2
(45) Date of Patent: Jan. 22, 2002

(54) POWER CIRCUIT WITH SMOOTHING CHOKE COIL INDUCTANCE VARYING CIRCUIT

(75) Inventor: Manabu Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/740,976

(22) Filed: Dec. 21, 2000

(30) Foreign Application Priority Data

Dec. 27, 1999 (JP) .............................. 11-371495

(51) Int. Cl.[7] .............................. H02M 3/335
(52) U.S. Cl. ...................... 363/21.04; 363/47
(58) Field of Search ............. 363/21.09, 21.1, 363/21.02, 21.03, 21.04, 39, 44, 45, 46, 47

(56) References Cited

U.S. PATENT DOCUMENTS 4,559,591 A * 12/1985 Grünsch ................ 363/21.09

FOREIGN PATENT DOCUMENTS

| DE | 40 29 447 A1 | 3/1992 |
| EP | 0 945 969 A1 | 9/1999 |
| JP | 07-264859 | 10/1995 |
| JP | 08-37778 | 2/1996 |
| JP | 08-130873 | 5/1996 |
| JP | 2799410 | 7/1998 |
| JP | 2917857 | 4/1999 |

OTHER PUBLICATIONS

Patent Absracts of Japan vol. 001, No. 153 (E–072), Dec. 8, 1997 corresponding to JP 52 095026 A (Hitachi Ltd), Aug. 10, 1977.

* cited by examiner

Primary Examiner—Shawn Riley
(74) Attorney, Agent, or Firm—Sughrue Mion, PLLC (57) ABSTRACT

A power circuit for rectifying and smoothing a commercial voltage to obtain a direct-current voltage. The power circuit comprises a smoothing choke coil inductance varying circuit for variably controlling an inductance value of a smoothing choke coil within a smoothing circuit. The smoothing choke coil inductance varying circuit flows a current through a secondary winding of the smoothing choke coil to provide induction based on an output voltage from a diode bridge such that an inductance value of a primary winding of the smoothing choke coil is at the maximum when the output voltage from the diode bridge is zero volt, is reduced with an increase in the output voltage, reaches a predetermined value when the output voltage is at the maximum, and is increased with a reduction in the output voltage.

4 Claims, 6 Drawing Sheets

POWER CIRCUIT WITH SMOOTHING CHOKE COIL INDUCTANCE VARYING CIRCUIT

BACKGROUND OF THE INVENTION

1. Field of the Invention

The present invention relates to a power circuit for an electrical apparatus for rectifying and smoothing commercial power of AC 100 V to 240 V to obtain a direct-current voltage.

2. Description of the Related Art

Electrical appliances such as televisions, personal computers and air conditioners for use at home are designed to operate on commercial power distributed to each home.

Conventional power circuits typically used in the electrical appliances operating on commercial power include a circuit of a capacitor input type comprising a smoothing capacitor.

Figure 1:
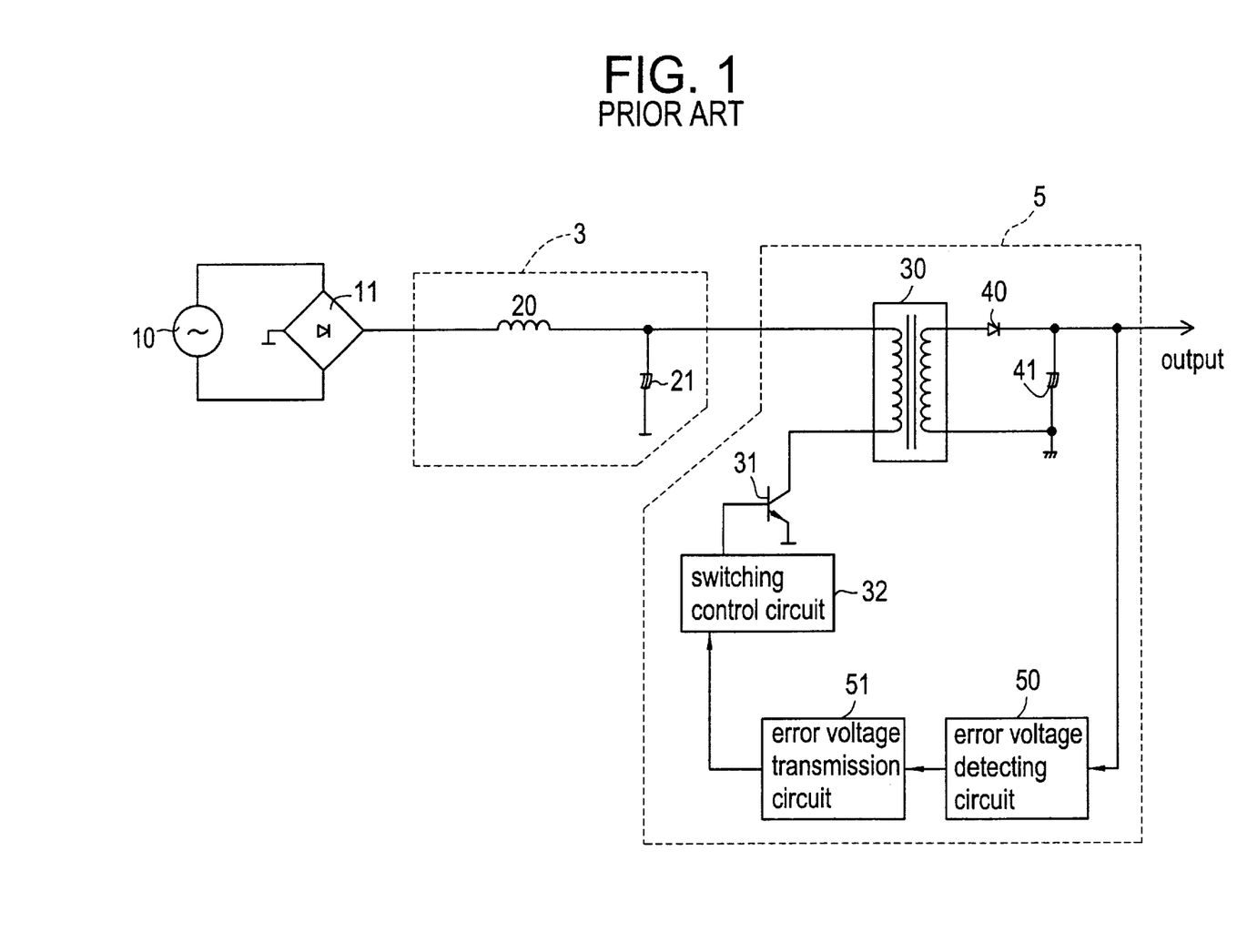
FIG. 1 is a circuit diagram showing an example of a conventional power circuit of a capacitor input type.

FIG. 1 is a circuit diagram showing an example of a conventional power circuit of such a capacitor input type.

The conventional power circuit shown in FIG. 1 comprises diode bridge 11 for performing full-wave rectification of an alternating voltage output from commercial power 10, smoothing circuit 3 for smoothing a pulsating flow voltage output from diode bridge 11, and DC-DC converter 5 for obtaining a desired voltage from a direct-current voltage output from smoothing circuit 3.

Smoothing circuit 3 comprises smoothing choke coil 20 for smoothing a current flow and smoothing capacitor 21 which is charged to smooth a voltage. One terminal of smoothing choke coil 20 is connected to an output of diode bridge 11, and smoothing capacitor 21 is connected between the other terminal thereof and a ground potential.

DC-DC converter 5 comprises switching transformer 30 for performing voltage conversion, rectifier diode 40 for rectifying output from switching transformer 30, smoothing capacitor 41 for smoothing output from switching transformer 30, error voltage detecting circuit 50 for detecting an error between an output voltage from DC-DC converter 5 and a desired voltage, error voltage transmission circuit 51 for transmitting the error in the output voltage, switching control circuit 32 for control to compensate for the error in the output voltage, and switching element 31 which is turned on/off by switching control circuit 32 for controlling a current flowing through a primary winding of switching transformer 30 to compensate for the error in the output voltage.

One terminal of the primary winding of switching transformer 30 is connected to the other terminal of smoothing choke coil 20, the other terminal of the primary winding of switching transformer 30 is connected to switching element 31, and one terminal of a secondary winding of switching transformer 30 is connected to an output through rectifier diode 40. The other terminal of the secondary winding of switching transformer 30 is grounded, and smoothing capacitor 41 is connected between the output and a ground potential.

Next, the operation of the conventional power circuit is described.

The power supply voltage of commercial power 10 is rectified in diode bridge 11, smoothed in smoothing choke coil 20 and smoothing capacitor 21, and supplied to the one terminal of the primary winding of switching transformer 30. Output from the secondary winding of switching transformer 30 is rectified in rectifier diode 40, smoothed in smoothing capacitor 41, and output as a signal with a desired voltage.

Switching control circuit 32 controls the operation of switching element 31 based on the output signal which is fed back through error voltage detecting circuit 50 and error voltage transmission circuit 51 to compensate for the error in the direct-current voltage.

Voltages of commercial power in specifications vary from country to country, and specifically, various alternating voltages ranging from AC 100 V to AC 240 V are standardized in respective countries. The standards are broadly divided into a 100 V system which employs a voltage value near 100V and a 200 V system which employs a voltage value near 200 V. It is desirable that electrical apparatuses for home use are used in common at home and overseas.

It is known that a conventional power circuit of the smoothing scheme of the capacitor input type as described above exhibits a low value in its power factor, which represents the utilization efficiency of a power source, since a current flows for a short time period near a peak voltage of the commercial power.

Thus, in recent years, since power circuits which employ the smoothing scheme of the capacitor input type are increasingly used in association with popularized electrical appliances, current of commercial power is concentrated near a peak voltage to cause voltage distortion and burning of a power distribution apparatus or the like. It is necessary to improve the power factor of the power circuits. While the use of a choke coil with a higher inductance value allows the improvement in the power factor, a more increase in the inductance value is not preferable due to problems such as increased heating and the like.

SUMMARY OF THE INVENTION

It is an object of the present invention to provide a power circuit with an improved power factor and limited heating to a relatively small amount.

To achieve the aforementioned object, the power circuit according to the present invention includes a smoothing choke coil inductance varying circuit within a smoothing circuit.

The smoothing choke coil inductance varying circuit flows a current through a secondary winding of the smoothing choke coil to provide induction based on a pulsating flow voltage obtained by rectifying an alternating voltage in a diode bridge, thereby performing such a control that an inductance value of a primary winding of the smoothing choke coil is at the maximum when the pulsating flow voltage is zero volt, is reduced with an increase in the pulsating flow voltage, reaches a predetermined value when the pulsating flow voltage is at the maximum, and is increased with a reduction in the pulsating flow voltage.

Such control of the inductance value of the smoothing choke coil enables an increase in the inductance value to enhance the improvement in the power factor when current is small and the power factor is low, and a reduction in the inductance to restrict the amount of produced heat when the current is large.

According to an embodiment of the present invention, the smoothing choke coil inductance varying circuit comprises means for determining whether the alternating voltage is of 100 V system or 200 V system based on the output voltage from the diode bridge to notify the smoothing choke coil of the determination result, and the smoothing choke coil includes means for changing its inductance value in accordance with the notification.

In this manner, since a check is made to determine whether the alternating voltage is of 100 V system or 200 V system to perform control with the inductance value of the smoothing choke coil suitable therefor, a conduction angle can be increased in a range from 100 V to 240 V to improve the power factor.

DESCRIPTION OF THE PREFERRED EMBODIMENTS

Figure 2:
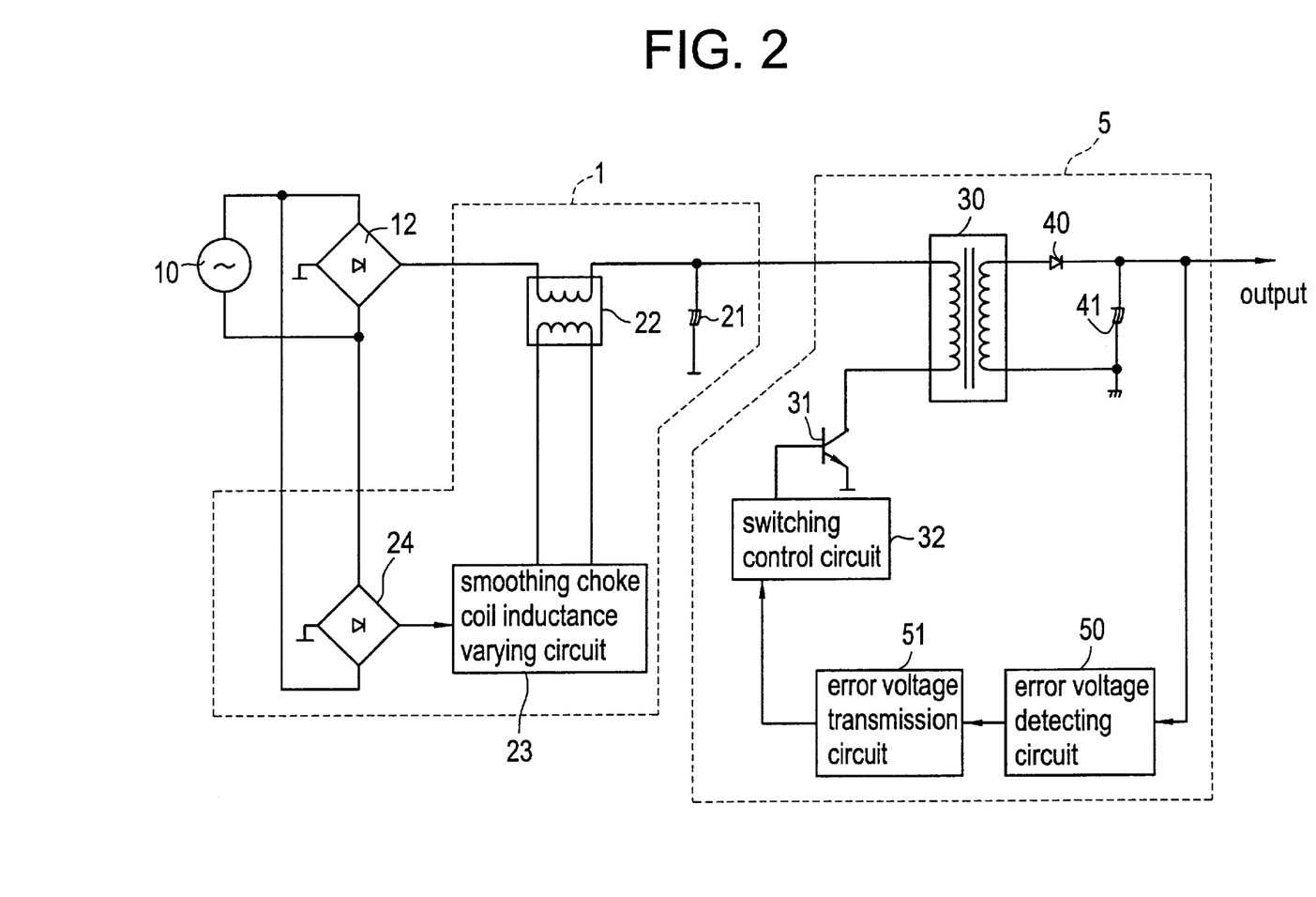
FIG. 2 is a circuit diagram showing a power circuit according to a first embodiment of the present invention.

Referring now to FIG. 2, there is shown a power circuit according to a first embodiment of the present invention comprising diode bridge 12 for performing full-wave rectification of an alternating voltage output from commercial power 10, smoothing circuit 1 for smoothing a pulsating flow voltage output from diode bridge 12, and DC-DC converter 5 for obtaining a desired direct-current voltage from a direct-current voltage output from smoothing circuit 1.

Smoothing circuit 1 comprises smoothing choke coil 22 having a primary winding and a secondary winding for smoothing a current flow by the primary winding, smoothing capacitor 21 which is charged to smooth a voltage, diode bridge 24 for performing full-wave rectification of an alternating voltage output from commercial power 10, and smoothing choke coil inductance varying circuit 23 for providing induction through the secondary winding of smoothing choke coil 22 based on output from diode bridge 24 to variably control the inductance value of the primary winding.

One terminal of the primary winding of smoothing choke coil 22 is connected to an output of diode bridge 12, and smoothing capacitor 21 is connected between the other terminal thereof and a ground potential.

An output from diode bridge 24 is supplied to smoothing choke coil inductance varying circuit 23, and an output from smoothing choke coil inductance varying circuit 23 is connected to both ends of the secondary winding of smoothing choke coil 22.

Since DC-DC converter 5 has a configuration similar to that of DC-DC converter 5 in the conventional power circuit shown in FIG. 1, the description thereof is omitted.

Figure 3:
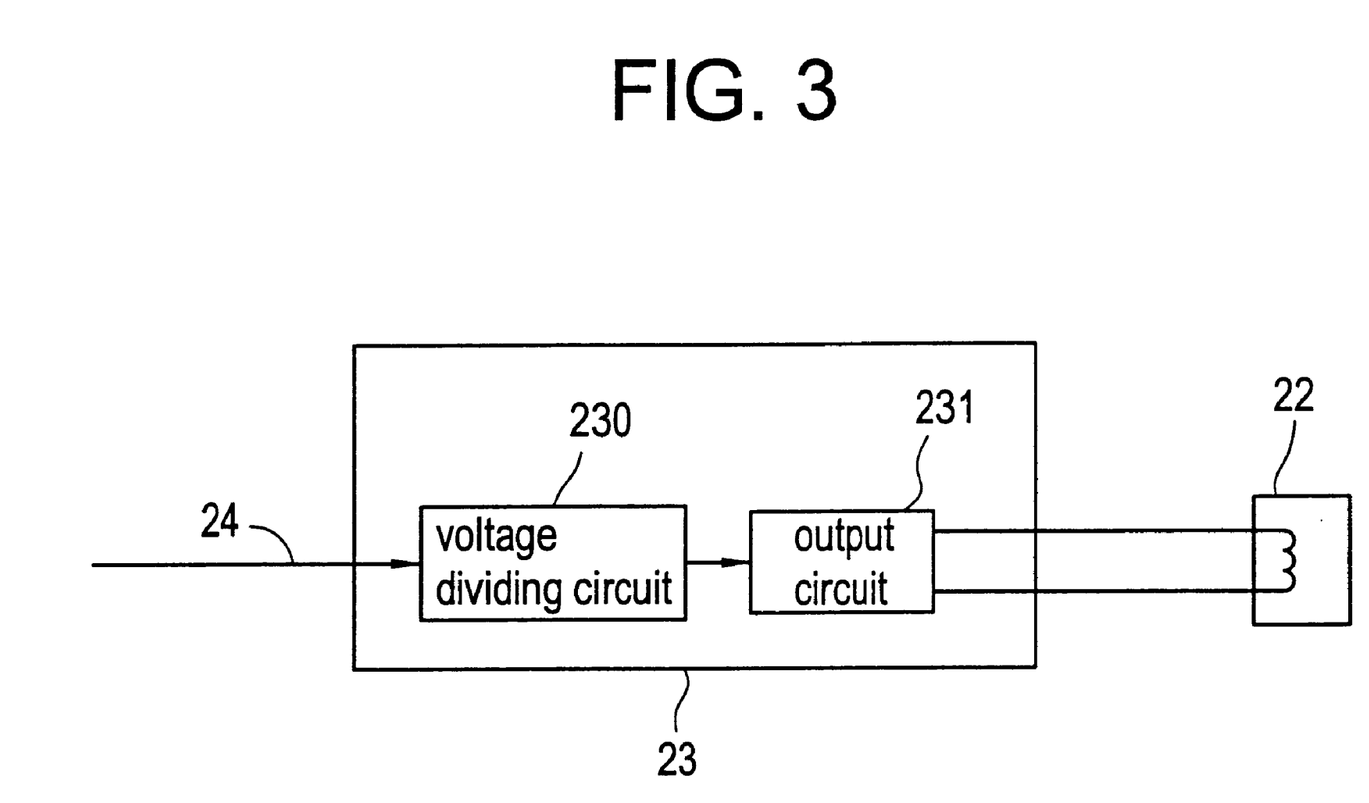
FIG. 3 is a circuit diagram showing a smoothing choke coil inductance varying circuit in the power circuit shown in FIG. 1.

Referring to FIG. 3, smoothing choke coil inductance varying circuit 23 comprises voltage dividing circuit 230 for dividing output from diode bridge 24, and output circuit 231 for flowing a current through the secondary winding of smoothing choke coil 22 to provide induction based on output from voltage dividing circuit 230, thereby controlling the inductance value of the primary winding.

Next, the operation of the power circuit of the first embodiment is described.

The power supply voltage of commercial power 10 is rectified in diode bridge 12, smoothed in smoothing choke coil 22 and smoothing capacitor 21, and supplied to the side of a primary winding of switching transformer 30. Output from a secondary winding of switching transformer 30 is rectified in rectifier diode 40, smoothed in smoothing capacitor 41, and output as a signal with a desired voltage.

Switching control circuit 32 controls switching element 31 based on a signal which is fed back through error voltage detecting circuit 50 and error voltage transmission circuit 51. Thus, the error in the direct-current voltage is compensated for.

The power supply voltage of commercial power supply 10 is also rectified in diode bridge 24, and the resultant pulsating flow voltage is divided by voltage dividing circuit 230 and supplied to output circuit 231. Output circuit 231 controls a current flowing though the secondary winding of smoothing choke coil 22 based on the pulsating flow voltage to variably control the inductance value of the primary winding of smoothing choke coil 22.

Figure 4:
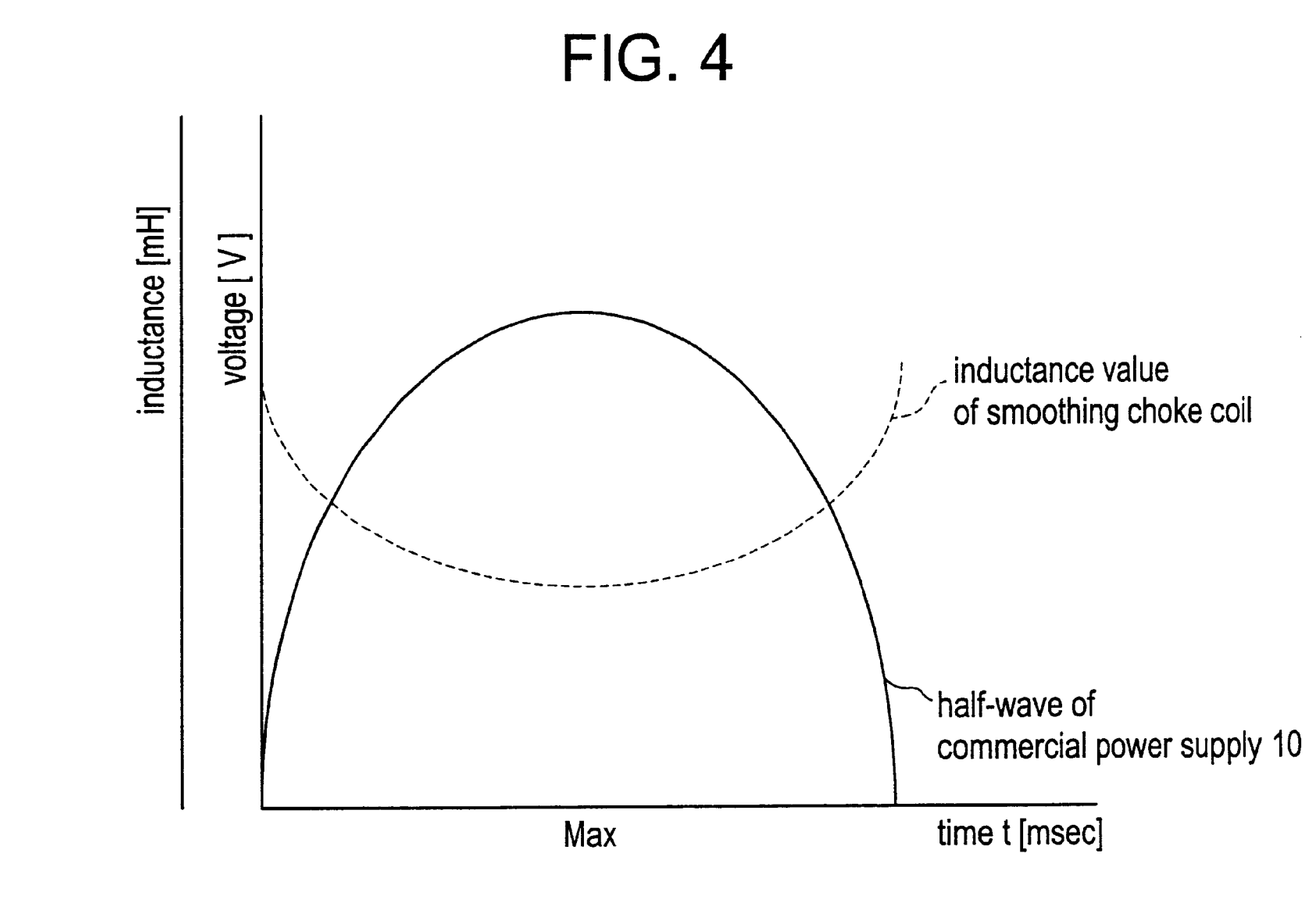
FIG. 4 is a graph illustrating changes in the inductance value of a primary winding of the smoothing choke coil.

FIG. 4 shows a graph illustrating changes in the inductance value of the primary winding of the smoothing choke coil.

The inductance value of the primary winding of smoothing choke coil 22 is set to be at a predetermined value when the pulsating flow voltage is at the maximum, and is controlled to become larger as the voltage deviates from the peak in a region except the maximum voltage.

Induction is provided through the secondary winding based on changes in voltage of commercial power 10 to control the inductance value of the primary winding of smoothing choke coil 22 such that the value becomes larger as the pulsating flow voltage deviates from the peak. Thus, the inductance value can be increased to enhance the improvement in the power factor when current is small and the power factor is low, and the inductance can be reduced to restrict the amount of produced heat when the current is large, thereby enabling the improvement in the power factor as well as the restriction of the amount of produced heat.

Figure 5:
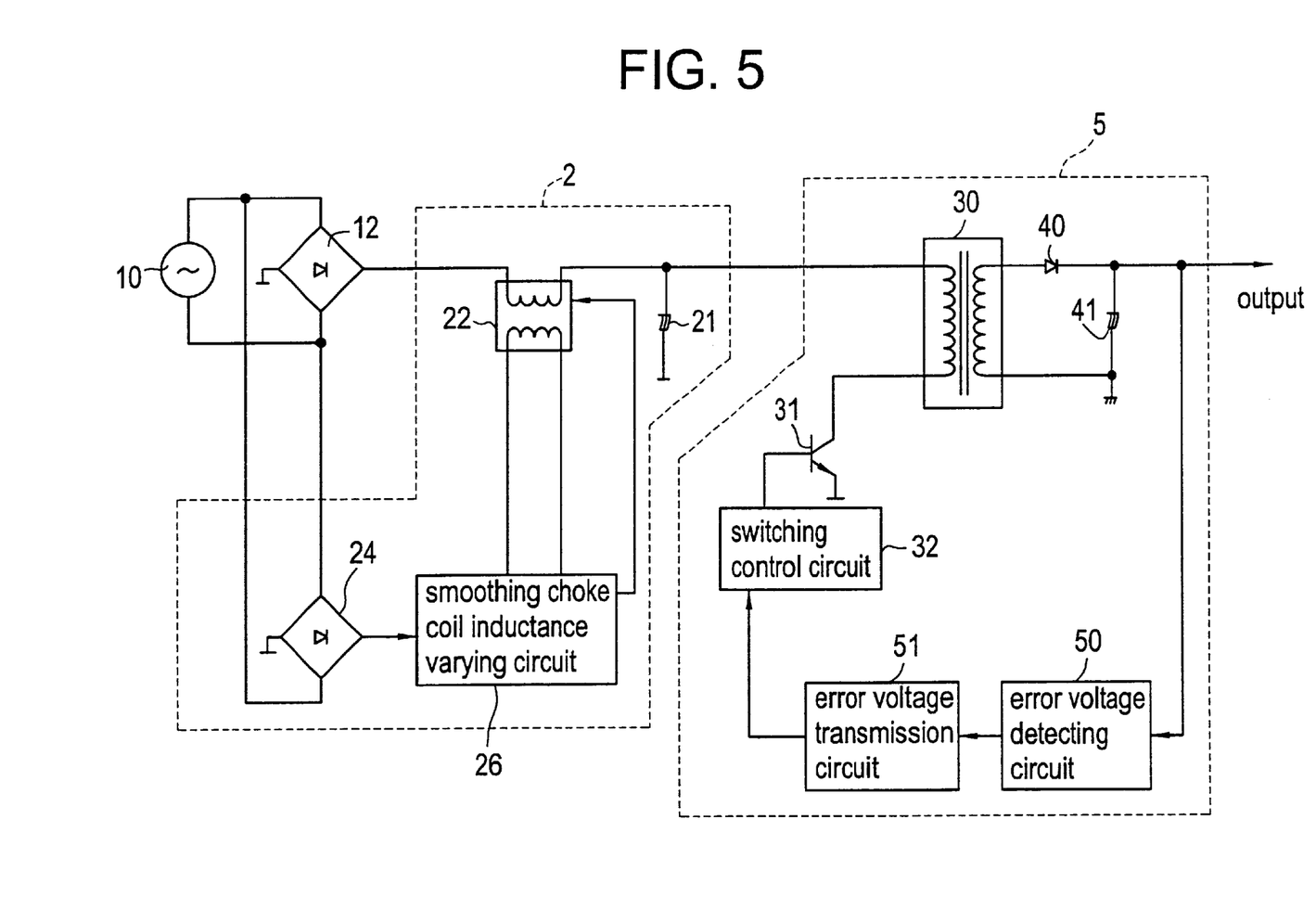
FIG. 5 is a circuit diagram showing a power circuit according to a second embodiment of the present invention.

Referring to FIG. 5, there is shown a power circuit according to a second embodiment of the present invention which differs from that of the first embodiment only in a smoothing circuit. Since the remaining portions are configured similarly to the first embodiment, the description thereof is omitted.

Smoothing circuit 2 comprises smoothing choke coil 25 which includes a primary winding and a secondary winding, smooths a current flow by the primary winding, and allows the use of an inductance value suitable for commercial power supply of 100 V system or 200 V system in response to instructions from the outside, smoothing capacitor 21 which is charged to smooth a voltage, diode bridge 24 for performing full-wave rectification of an alternating voltage output from commercial power 10, and smoothing choke coil inductance varying circuit 26 for providing induction through the secondary winding of smoothing choke coil 25 based on output from diode bridge 24 to variably control the inductance value of the primary winding and for determining whether the commercial power supply is of 100 V system or 200 V system to notify smoothing choke coil 25 of the determination result.

One terminal of the primary winding of smoothing choke coil 25 is connected to an output from diode bridge 12, and smoothing capacitor 21 is connected between the other terminal thereof and a ground potential.

An output from diode bridge 24 is supplied to smoothing choke coil inductance varying circuit 26, and outputs from smoothing choke coil inductance varying circuit 26 are connected to both ends of the secondary winding of smoothing choke coil 22. A signal indicating the determination result of whether the commercial power supply is of 100 V system or 200 V system is connected to smoothing choke coil 25.

Since DC-DC converter 5 has a configuration similar to that of the DC-DC converter of the conventional power circuit shown in FIG. 1, the description thereof is omitted.

Figure 6:
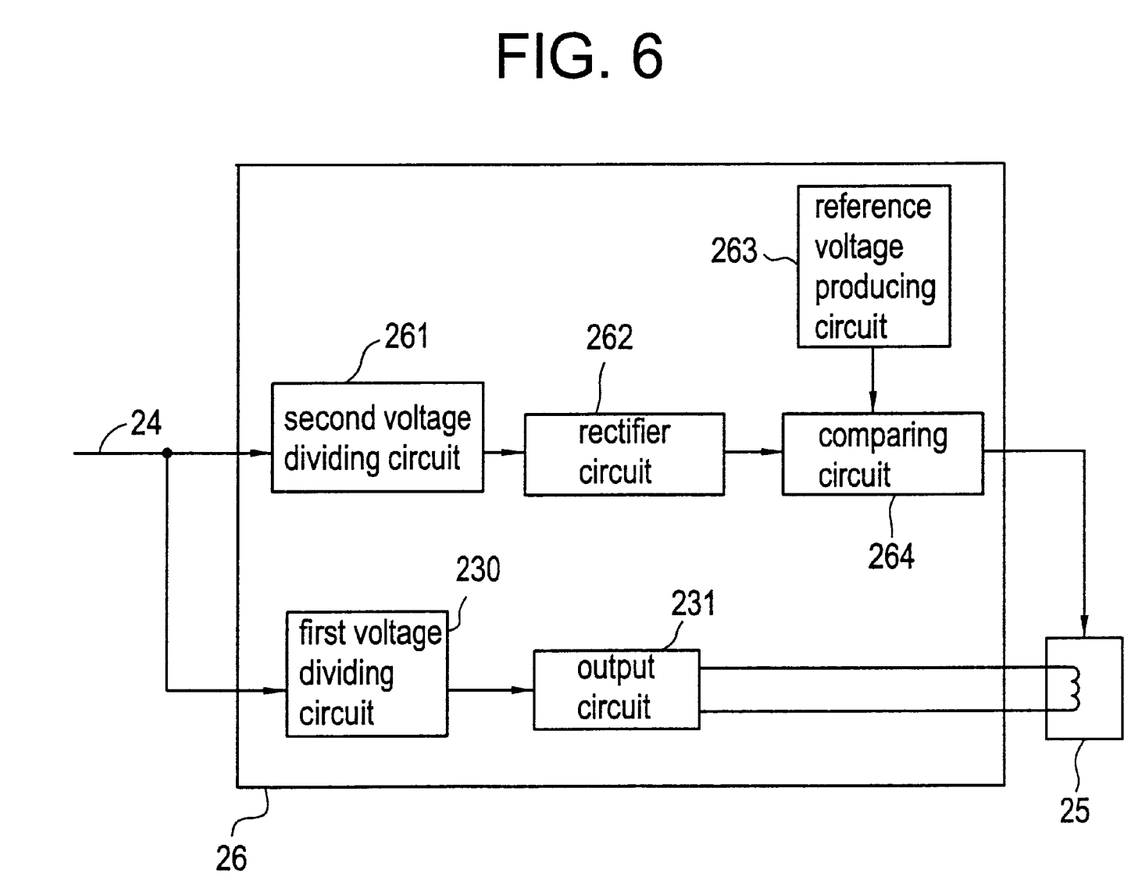
FIG. 6 is a circuit diagram showing a smoothing choke coil inductance varying circuit in the power circuit shown in FIG. 5.

As shown in FIG. 6, smoothing choke coil inductance varying circuit 26 comprises, in addition to voltage dividing circuit 230 and output circuit 231 configured similarly to the counterparts in smoothing choke coil inductance varying circuit 23 in the first embodiment, voltage dividing circuit 261 for dividing output from diode bridge 24, rectifier circuit 262 for rectifying output from voltage dividing circuit 261, reference voltage producing circuit 263 for producing a reference voltage used to determine whether commercial power supply 10 is of 100 V system or 200 V system, and comparing circuit 264 for comparing the reference voltage with the voltage of output from rectifier circuit 262 to determine whether commercial power system 10 is of 100 V system or 200 V system. The voltages of output signals from voltage dividing circuit 230 and reference voltage producing circuit 263 are set respectively such that the voltage of output from voltage dividing circuit 230 is lower than the reference voltage when the commercial power supply is of 100 V system, or the voltage of output from voltage dividing circuit 230 is higher than the reference voltage when the commercial power supply is of 200 V system.

Next, description is made for the operation of the portion of the power circuit of the second embodiment different from that of the first embodiment.

Smoothing choke coil inductance varying circuit 26 determines whether commercial power supply 10 is of 100 V system or 200 V system, and the determination result is notified to smoothing choke coil 25. Smoothing choke coil 25 refers to an inductance value suitable for the 100 V system when the determination result indicates the 100 V system, or an inductance value suitable for the 200 V system when the determination result indicates the 200 V system. Control for varying the inductance value is performed similarly to the first embodiment with the inductance value suitable for the 100 V system or 200 V system.

Since the power circuit of the second embodiment automatically determines whether the commercial power supply is of 100 V system or 200 V system to perform control with an inductance value suitable therefor, a conduction angle can be increased in a range from 100 V to 240 V to improve the power factor, thereby making it possible to render the circuit usable in common at home and overseas.

It should be noted that while the aforementioned embodiments both use an RCC circuit as an example for description, the present invention is also applicable to power circuits with other configurations, such as a series regulator, PWM, forward type or the like.

While preferred embodiments of the present invention have been described using specific terms, such description is for illustrative purposes only, and it is to be understood that changes and variations may be made without departing from the spirit or scope of the following claims.

What is claimed is:

1. A power circuit for receiving an alternating voltage and outputting a desired current-direct voltage, comprising:
    a diode bridge for performing full-wave rectification of said alternating voltage;
    a smoothing choke coil having a primary winding and a secondary winding for smoothing an output voltage from said diode bridge by said primary winding;
    a smoothing circuit including a smoothing choke coil inductance varying circuit for flowing a current through said secondary winding of said smoothing choke coil to provide induction based on said output voltage from said diode bridge such that an inductance value of said primary winding of said smoothing choke coil is at the maximum when said output voltage from said diode bridge is zero volt, is reduced with an increase in said output voltage, reaches a predetermined value when said output voltage is at the maximum, and is increased with a reduction in said output voltage; and
    a DC—DC converter for obtaining a desired direct-current voltage from a direct-current voltage output from said smoothing circuit.

2. The power circuit according to claim 1, wherein said smoothing choke coil inductance varying circuit includes:
    a voltage dividing circuit for dividing an output voltage from said diode bridge;
    an output circuit for flowing a current through said secondary winding of said smoothing choke coil to provide induction based on said output voltage from said diode bridge such that an inductance value of said primary winding of said smoothing choke coil is at the maximum when said output voltage from said voltage dividing circuit is zero volt, is reduced with an increase in said output voltage, reaches a predetermined value when said output voltage is at the maximum, and is increased with a reduction in said output voltage.

3. The power circuit according to claim 1, wherein said smoothing choke coil inductance varying circuit includes means for determining whether said alternating voltage is of 100 V system or 200 V system based on said output voltage to notify said smoothing choke coil of the determination result, and
    said smoothing choke coil includes means for changing its inductance value in accordance with said notification.

4. The power circuit according to claim 1, wherein said smoothing choke coil inductance varying circuit includes:
    a first voltage dividing circuit for dividing said output voltage;
    an output circuit for flowing a current through said secondary winding of said smoothing choke coil to provide induction based on an output voltage from said first voltage dividing circuit such that an inductance value of said primary winding of said smoothing choke coil is at the maximum when said output voltage from said first voltage dividing circuit is zero volt, is reduced with an increase in said output voltage from said first voltage dividing circuit, reaches a predetermined value when said output voltage from said first voltage dividing circuit is at the maximum, and is increased with a reduction in said output voltage from said first voltage dividing circuit;

a second voltage dividing circuit for dividing said output voltage;

a rectifier circuit for rectifying an output voltage from said second voltage dividing circuit;

a reference voltage producing circuit for producing a reference voltage for determining whether a voltage of said alternating voltage is of 100 V system or 200 V system; and a comparing circuit for comparing an output voltage from said rectifier circuit with said reference voltage to determine whether said alternating voltage is of 100 V system or 200 V system for outputting the determination result.

* * * * *